May 24, 1960
A. BRUEDER
2,937,393
WINDSHIELD WIPER
Filed July 2, 1957
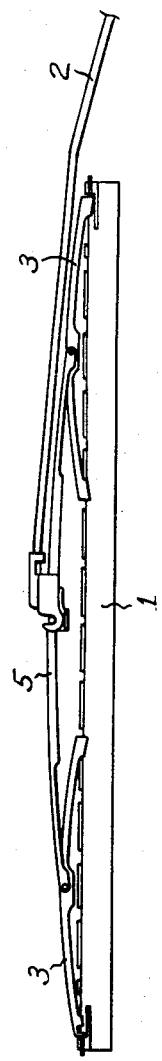
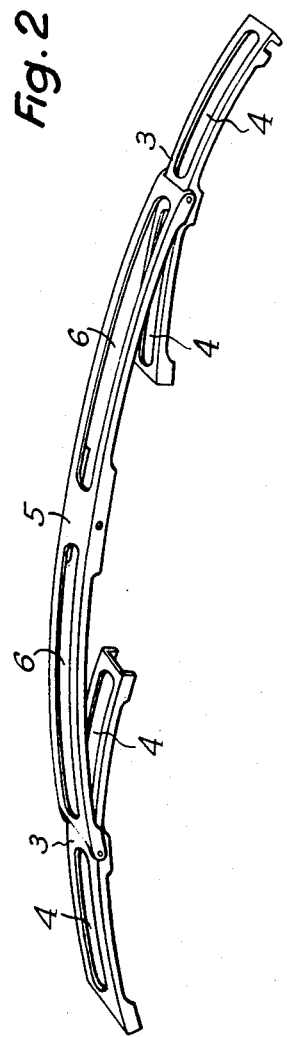

United States Patent Office 2,937,393
Patented May 24, 1960

2,937,393

WINDSHIELD WIPER

Antoine Brueder, Paris, France, assignor to Societe Anonyme Andre Citroen, Paris, France Filed July 2, 1957, Ser. No. 669,657

Claims priority, application France July 10, 1956

2 Claims. (Cl. 15—245)

This invention relates to windshield wipers for automotive vehicles. In recent years problems have arisen in connection with the construction of windshield wipers, both because of the large-area, curved and sloping surface configurations that are being imparted to the windshields according to current trends, and because of the increased speed of vehicles and consequent wind pressure on the wipers.

On cars having curved backswept windshields, the curvature of the rubber wiper element has to vary during the swing in order to match the varying curvature of the windshield along different directions. To allow for this and also for the increased strains imposed on the wiper supporting means, the wiper element is now usually supported from its swinging arm through an armature of substantial cross-sectional size, rather than being directly attached to a relatively thin rod-like arm as was the case with the flat windshields of the past. The area presented to wind pressure is therefore considerably increased.

It should first be noted that the effect of relative wind upon the wiper is such as to tend to force the wiper away from the windshield rather than applying it against the windshield. This is because the air filaments tend to sweep across the windshield surface, either upwards or backwards around the vehicle depending on the shape of the windshield and vehicle body, the vehicle speed, and the velocity and true direction of the wind. The airflow thus presses against the inner surfaces of the wiper assembly, and particularly the inner surface of the support or armature mounting the wiper or scraper element upon the swinging arm thereof. The effective surface area thus subjected to wind pressure may attain 30 square centimeters or more, so that the resulting force acting to deflect the wiper away from the windshield surface may easily amount to several hundred grams. This renders the wiping action ineffective at high speeds especially in storm conditions where rain tends naturally to be accompanied by strong wind.

The conventional palliative for this difficulty has generally been to increase the spring pressure applying the wiper against the shield. It has also been proposed to fit the wiper with small wing-like flaps spaced from the windshield surface so that the action of relative wind thereagainst at high speeds will tend to apply the wiper against the windshield. Such flaps are cumbersome and ungainly and impair driving visibility, and moreover their action is not satisfactory because their orientation relative to the wind direction varies considerably over the arc described by the wiper at each swing. It has also been attempted to decrease the effective surface exposed to the pressure of the air filaments sweeping across the windshield and for this purpose to construct the wiper support in the form of a relatively thin rod. But such construction does not provide sufficient strength for the wiper support which is apt to bend and twist, especially since the connection of the wiper with the rod-like support is difficult to accomplish and requires perforating or flattening the rod.

A general object of this invention is to provide an improved windshield wiper having increased effectiveness at high vehicle speeds and under windy conditions. Other objects are to provide a windshield wiper which has reduced sensitivity to wind pressure, increased strength and rigidity and which does not impair driving visibility.

According to the invention, a windshield wiper assembly comprises a wiper support including one or more perforate elements. The wide perforations in the support serve not only to reduce the surface area exposed to the undesirable back pressure tending to force the wiper away from the windshield surface, but promote flow of a large fraction of the air sweeping across the shield through said perforations and around the wiper element, thereby apparently tending to create a force component applying the wiper against the windshield, which component substantially offsets the back-pressure effect mentioned above. Efficient wiping operation is thus obtained even at high motoring speeds and in high winds.

One exemplary embodiment of the invention is illustrated, by way of indication but not of limitation in the accompanying drawings, wherein:

Fig. 1 is a side view of the wiper assembly; and

Fig. 2 is a perspective view of the supporting armature therein.

As shown, the windshield wiper assembly comprises a conventional wiper or scraper member 1. Removably secured to the scraper 1 near the opposite ends of it are a pair of perforate, arcuate metallic elements 3, the ends of each element 3 being crimped or otherwise fixed to spaced points of the scraper 1. As shown, each element 3 is formed with wide perforations 4 extending from close to the midpoint of the element nearly to each end of it. Pivoted to the midpoint of each element 3 is a related end of a main supporting element 5 which is of a shape generally similar to that of each of the minor elements 3, though of larger dimensions. The element 5 is likewise formed with two wide cutouts therein as shown at 6. The element 5 is suitably pivoted at its midpoint to the conventional swinging arm 2 of the windshield wiper.

What I claim is:

1. A windshield wiper comprising an elongated flexible wiper member, and an elongated support overlying the flexible wiper member and operatively connected therewith at its ends, said support being cut out over a substantial portion of its surface to permit an air flow through the cut-out portion and to decrease the lifting component of air pressure against the support when the assembly is associated with the windshield.

2. A windshield wiper comprising a flexible wiper member, a main support element, and a pair of minor support elements pivoted to opposite ends of said main element substantially at the midpoints of said minor elements, and said minor elements having their ends attached to spaced points of said flexible wiper member, said support elements all having surfaces thereof overlying the surface of the flexible wiper member, said support elements being cut out over a substantial portion of their surfaces to permit air flow therethrough and to decrease the lifting component of air pressure against the support elements when the assembly is associated with a windshield.

References Cited in the file of this patent

UNITED STATES PATENTS 2,548,090    Anderson _____ Apr. 10, 1951